April 12, 1966
H. L. ERICKSON
3,245,651
APPLIANCE DRAIN VALVE
Filed Jan. 29, 1963
2 Sheets-Sheet 1
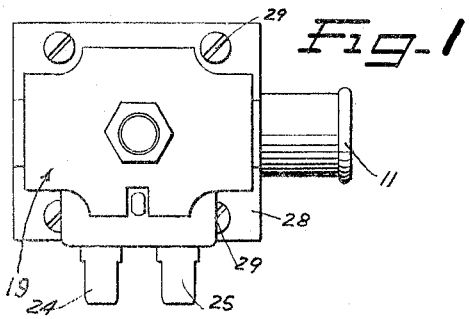
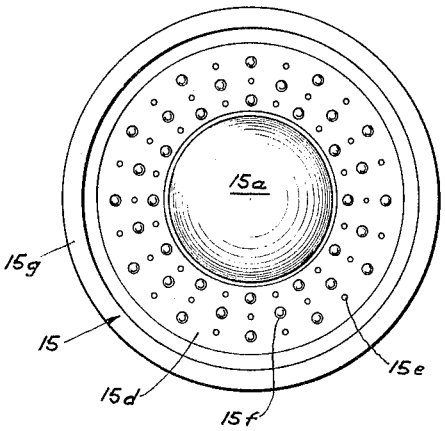
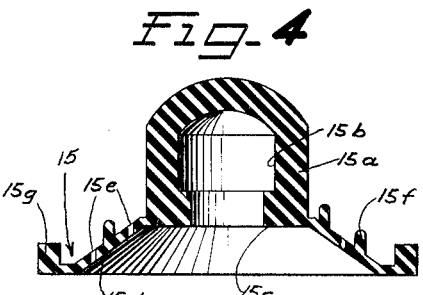
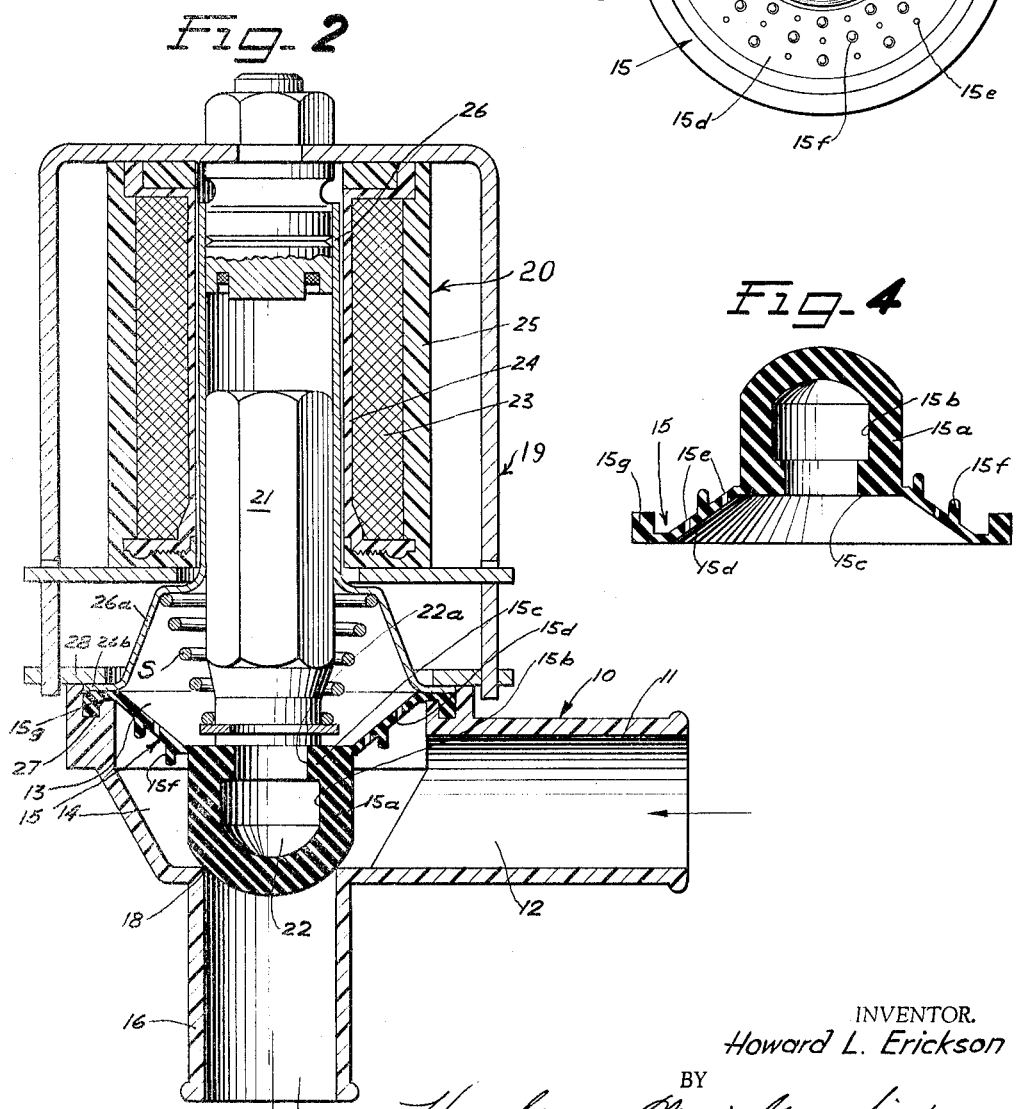
INVENTOR.
Howard L. Erickson
BY
ATTORNEYS

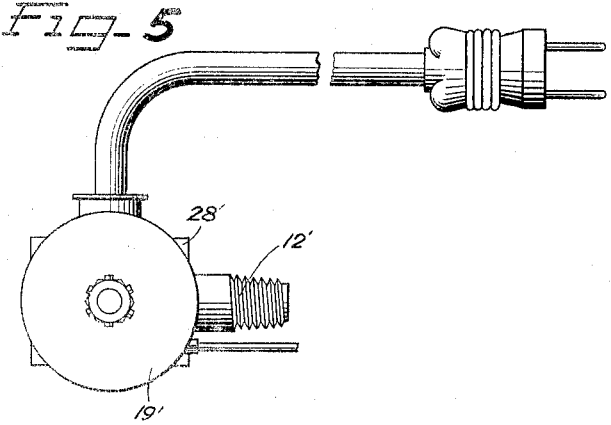
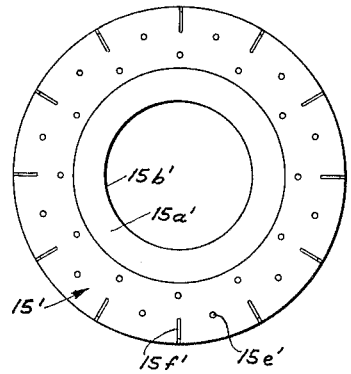
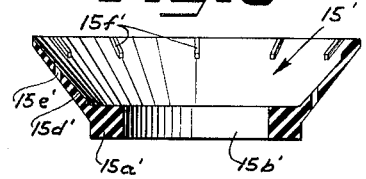
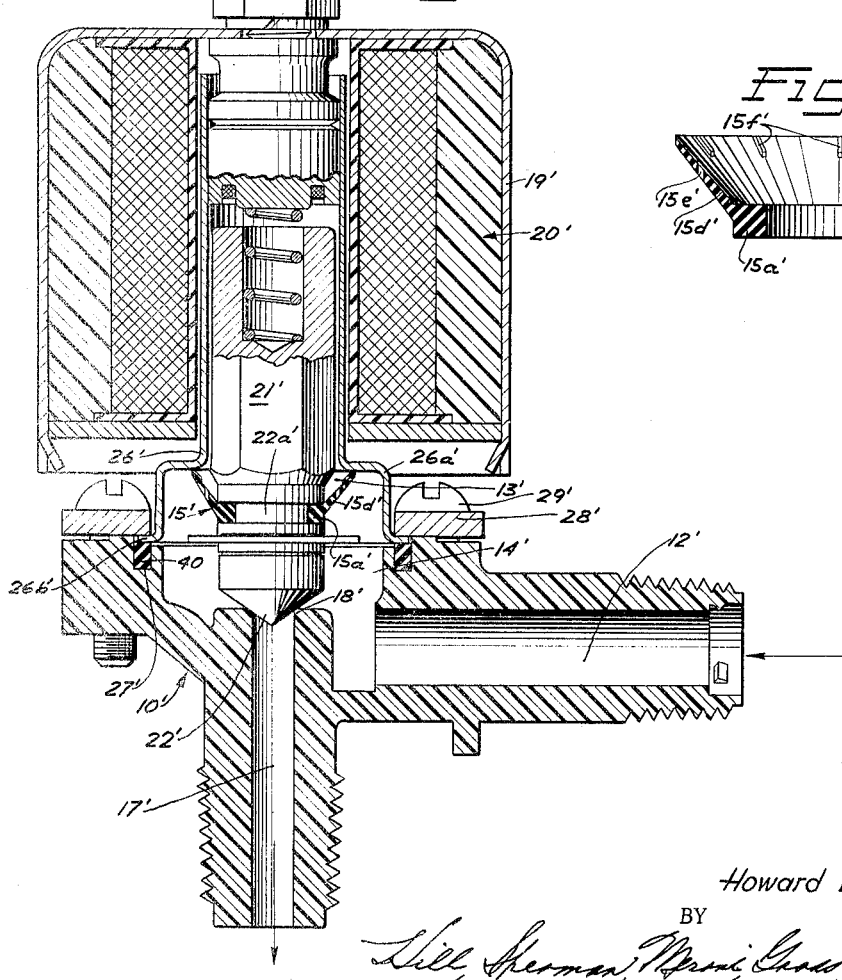

United States Patent Office 3,245,651
Patented Apr. 12, 1966

3,245,651
APPLIANCE DRAIN VALVE
Howard L. Erickson, Bensenville, Ill., assignor to The Dole Valve Company, a corporation of Illinois
Filed Jan. 29, 1963, Ser. No. 254,702
9 Claims. (Cl. 251—129)

The present invention relates generally to solenoid operated drain valves and more particularly to new armature carried flexible diaphragm-like screens for protecting the armatures of the solenoids.

In the past, in accordance with the teachings contained in the D. H. Halenza Patent No. 2,500,750, it was the practice to provide drain valves with perforated diaphragms supported independently of the armatures of the solenoids for use in the metering of fluid and equalization of pressure.

The present valve invention differs from the prior art in that the diaphragm-like screens are mounted directly on the armature and further the diaphragms are provided with projections or ribs for minimizing clogging of the diaphragm holes by solid matter or particles such as, onion skins and other garbage particles commonly encountered in a dishwashing machine or in a water softener using such a valve.

It has been found that by providing the resilient rubber-like diaphragm screen with needle-like ribs or projections that the screen can more effectively operate to protect the armature and other solenoid components from becoming contaminated due to particles, while also permitting an equalization of pressure on both sides of the rubber diaphragm screen. The resilient screen also has a self-cleaning characteristic for when the valve is opened, water will escape through the screen holes tending to clean any material lodged over the screen holes.

It is an improtant object of this invention to provide a new and improved drain valve including a perforated diaphragm-like screen having ribs disposed about the holes for preventing blockage of the holes.

A still further important object of the present invention is to provide a new and improved solenoid operated drain valve wherein a resilient diaphragm screen is mounted directly on the armature to simplify the construction of the drain valve so that the drain valve can be manufactured at a reduced cost and so that it may operate more effectively.

According to important features of the present invention, the ribs may be mounted on either side of a frusto-conical portion of the perforated resiilent diaphragm screen in adjacency to the holes therein.

It has been found that the construction of the drain valve may be simpified by mounting the perforated resilient diaphragm screen directly on the armature so that the screen will move back and forth as the armature is reciprocated. This feature is important because the cost of manufacture of the drain valve may be reduced as compared to prior types of drain valves.

Other objects and important features of the present invention will more fully become apparent in view of the following detailed description taken in conjunction with the accompanying drawings illustrating several embodiments and in which:

FIGURE 1 is a top plan view of a solenoid operated drain valve embodying important features of the present invention;

FIGURE 2 is a vertical section with parts being shown partially in elevation of the drain valve shown in FIGURE 1;

FIGURE 3 is a top plan view of a perforated resilient diaphragm screen;

FIGURE 4 is a vertical section of the screen shown in FIGURE 3;

FIGURE 5 is a top plan view of a modified type of drain valve;

FIGURE 6 is a vertical section of the modified drain valve shown in FIGURE 5;

FIGURE 7 is a bottom plan view of the modified resilient diaphragm screen shown in FIGURE 6; and FIGURE 8 is a vertical section of the screen shown in FIGURE 7.

Referring now to FIGURES 1–4 of the drawings, it will be noted that the reference numeral 10 indicates a main housing having a boss 11 containing an inlet duct 12 for connection with a suitable fluid supply pipe (not shown). The housing 10 has a chamber area including upper and lower fluid chambers 13 and 14 which are separated from one another by means of a resilient diaphragm-like screen 15. The screen 15 may be manufactured from a suitable elastomeric material and excellent results may be obtained wherein the screen is comprised of rubber. In this form the diaphragm screen 15 also comprises a drain valve.

The housing 10 is further provided with a boss 16 defining an outlet 17. The boss 16 has a valve seat 18 at its end adjacent to the lower fluid chamber 14.

Mounted upon the housing 10 is a solenoid housing 19 having an electro-magnet or solenoid 20 disposed therein. The solenoid 20 is of a conventional construction and includes an armature or solenoid actuated valve member 21 having a lowered tapered or pointed end portion 22. A spring S is provided for holding the diaphragm 15 and the valve member 21 engaged with the valve seat 18. Mounted about the armature 21 is an electric coil 23 and insulator bushings 24 and 25 are provided encasing the coil. When the electro-magnet or solenoid 20 is energized through its terminals 24 and 25, the pilot valve or armature 21 is drawn up into the armature housing or sleeve guide 26.

The diaphragm-like screen 15 has a centrally thickened plug-like screen portion 15a provided with a cup-shaped recess 15b which is locked in assembly with the tapered armature end portion 22 so that the diaphragm plug-like screen portion 15a is caused to reciprocate with the armature 21. In order to lock the valve plug or portion 15a with the tapered end 22, the tapered end 22 is provided with an annular groove 22a and the screen locking rib 15c is snapped therein when the tapered end 22 is disposed within the cup-shaped recess 15b.

An annular frusto-conical flexible diaphragm screen portion 15d is disposed circumferentially about the centrally thickened valve plug portion 15a in assembly therewith. The screen portion 15d has a series of axial holes 15e of sufficient size and number to permit equalization of fluid pressure in the fluid chambers 13 and 14. Also disposed on the portion 15d between the holes 15e is a series of needle-like projections or ribs 15f embodying important features of this invention. These projections or ribs 15f provide means for minimizing or preventing blockage of the holes 15e by onion skins or other garbage particles or other relatively large particles which may be contained within the fluid that is to be caused to flow through the housing chambers 13 and 14.

In order to prevent the fluid from flowing past the screen 15, the screen has an outer annular margin 15g that bears on the housing and may be fixedly mounted within an annular housing groove 27, as illustrated.

A lower enlarged cup-shaped end 26a of the armature housing 26 is engaged on top of the outer screen margin 15g. A housing plate is mounted on a marginal flange 26b for holding the outer margin 15g within the groove 27. Fasteners or screws 29 are threaded into the housing 10 and through the housing plate 28 to secure the plate and the screen in unitary assembly with the housing 10.

The small holes 15e in the dishwasher diaphragm screen 15 allow the pressure at the inlet 12 to build up and facilitate seating of the diaphragm valve plug member 15a against the seat 18 while a frusto-conical diaphragm screen portion 15d protects the operating parts of the solenoid including the armature 21 and the guide 26 from contamination. The screen 15 also has a self-cleaning characteristic, for when the valve plug 15a is disengaged from the seat 18, water will escape from the holes 15e freeing any material from blocking the holes.

Illustrated in FIGURES 5–8 of the drawings is a modified form of my invention and it will be noted that primed reference numerals have been employed for the purpose of identifying parts which generally correspond with the parts previously described in connection with the embodiment shown in FIGURES 1–4. In this instance the reference numeral 10' refers to a housing having an inlet duct 12' as well as a chamber area including upper and lower fluid chambers 13' and 14' which are separated from one another by means of a resilient diaphragm-like screen 15'. The screen 15' may be comprised of any suitable material such as rubber and the like. Disposed below the chambers 13' and 14' is an outlet 17' and it will be noted that a valve seat 18' is disposed at the end of the outlet 17'.

Mounted upon the housing 10' is a solenoid housing 19' containing a solenoid 20' which is essentially identical to the solenoid 20 previously described. The solenoid 20' includes an armature or valve member 21' having a tapered end portion 22' for engagement with the valve seat 18'. The armature 21' is housed or disposed within an armature housing or guide 26' which includes a cup-shaped end 26a' as well as an outer marginal flange 26b' which is seated on a gasket 40 contained within a housing recess 27'. A ring or plate 28' is secured by screws 29' to the housing 10' for clamping the cup-shaped end 26a' in sealed assembly therewith.

This form of my invention differs from the previously described form primarily in the construction of the diaphragm-like screen 15'. In this instance the screen 15' does not operate as a valve member, but functions primarily as means for preventing the contamination of the armature 21' as well as its guide 26'.

The screen 15' includes a centrally thickened screen portion 15a' having an enlarged centrally located screen hole 15b' therein. The diaphragm 15' is further provided with an annular frusto-conical ring-shaped flexible screen portion 15d' having a series of axial holes 15e' therein. According to important features of this invention, an outer margin of the screen portion 15d' is provided with a series of circumferentially spaced needle-like projections or ribs 15f'.

The valve end 22' of the armature 21' is provided with an annular groove 22a' and the centrally thickened screen portion 15a' is retainingly engaged therein.

The diaphragm screen 15' is particularly adapted for use in a water softener drain valve for protecting the armature from jamming when the valve is subjected to dirt, mineral fines, etc., during the operation. The small holes 15e' and the projections or ribs 15f' permit an equalization of pressure on both sides of the diaphragm. The small holes 15e' are self-cleaning during the operation of the armature 21' for water will be caused to flow back and forth through these holes as the armature is reciprocated.

In both forms the projections on the diaphragm screen by virtue of their proximity to the screen apertures assist in keeping solid particles in the fluid from blocking the apertures. We believe this is accomplished by the projections causing eddy currents in the fluid or liquid about the screen holes. The projections do not, however, interfere with the oozing of liquid, back into the valve area.

It will be understood that modifications and variations may be effected without departing from the scope of the novel concepts of the present invention.

I claim as my invention:

1. In a solenoid operated valve including an armature and a valve seat and a resilient diaphragm-like screen for protecting the armature, the improvement of
a central valve plug portion on said screen retainingly engaged on and movable with said armature into and out of engagement with said valve seat,
said screen comprising an annular ring-shaped resilient portion having series of holes therein and being disposed circumferentially about said central valve plug portion for protecting said armature from contamination, and
a series of projections on said annular ring-shaped portion projecting away from said holes and away from said screen for preventing the holes from becoming blocked.

2. In a solenoid operated valve including an armature and a valve seat and a resilient diaphragm-like screen for protecting the armature, the improvement of
a central valve plug portion on said screen retainingly engaged on and movable with said armature into and out of engagement with said valve seat,
said screen having an annular ring-shaped resilient portion having a series of holes therein and being disposed circumferentially about said central valve plug portion for protecting said armature from contamination,
a series of projections on said annular ring-shaped portion projecting away from said holes and away from said screen for preventing the holes from becoming blocked, and,
said projections being disposed between said holes for preventing blockage of the holes by solid particles.

3. In a solenoid operated valve including an armature and a valve seat and a resilient diaphragm-like screen for protecting the armature, the improvement of
a central thickened valve plug portion on said screen having a recess with an end of said armature retainingly engaged therein and with said thickened portion comprising a valve member movable with said armature into and out of direct engagement with said valve seat,
an annular ring-shaped screen portion having a series of holes therein and being disposed circumferentially about said central thickened valve plug portion, and
a series of needle-like projections on said ring-shaped annular portion projecting away from said holes and with said projections being disposed between said holes for preventing blockage of the holes by solid particles.

4. A resilient diaphragm screen comprised of an elastomeric material for attachment to an end of an armature on a solenoid valve comprising:
a centrally thickened portion having a recess for receipt of an end of an armature,
an annular ring-shaped diaphragm screen portion having a series of holes therein and being disposed circumferentially about said centrally thickened portion, and
a series of needle-like projections on said ring-shaped annular portion projecting away from said holes and with said projections being disposed between said holes for preventing blockage of the holes by solid particles.

5. A resilient diaphragm screen comprising:
means for attaching the same to an armature including a centrally thickened portion having a recess for receipt of an end of an armature,
a frusto conical ring-shaped screen portion having a series of holes therein and being disposed circumferentially about said centrally thickened portion, and
a series of needle-like projections on said ring-shaped annular portion projecting away from said holes and with said projections being disposed between said holes for preventing blockage of the holes by solid particles.

6. In a solenoid operated valve having a housing having a valve chamber area defined by a housing wall and including a valve seat and a resilient diaphragm screen in the chamber area for protecting a solenoid armature extended into the chamber area, the improvement of a centrally thickened portion on said screen having a cup-shaped recess with an end of said armature retainingly engaged therein and with said centrally thickened portion comprising a valve plug movable with said armature into and out of direct engagement with said valve seat, an annular ring-shaped diaphragm screen portion having a series of holes therein and being disposed circumferentially about said centrally thickened portion with its outer margin engaged with the housing wall dividing the chamber area into adjacent chambers, and a series of needle-like projections on said ring-shaped annular portion projecting away from said holes and with said projections being disposed between said holes for preventing blockage of the holes by solid particles.

7. In a solenoid operated valve having a housing having a valve chamber area defined by a housing wall and including a valve seat and a resilient diaphragm screen in the chamber area for protecting a solenoid armature extended into the chamber area, the improvement of a centrally thickened portion on said diaphragm having a cup-shaped recess with an end of said armature retainingly engaged therein and with said centrally thickened portion comprising a valve plug movable with said armature into and out of direct engagement with said valve seat, an annular ring-shaped flexible screen portion having a series of holes therein and being disposed circumferentially about said centrally thickened portion, said screen having an outer margin fixedly mounted within an annular groove in the housing wall dividing the chamber area into adjacent chambers and with the flexible screen portion being flexed with the reciprocation of the armature with respect to said outer margin of the screen, and a series of needle-like projections on said ring-shaped annular portion projecting away from said holes with said projections being disposed between said holes for preventing blockage of the holes by solid particles.

8. In a valve construction including a housing having a fluid inlet and an outlet.

a valve structure between the inlet and outlet including a valve seat in the housing and a reciprocable valve element having a stem slidably supported in the housing and a plug-like end for engaging said seat to close off the flow between said inlet and outlet, and a resilient flexible annular screen about said element with its inner edge engaged about the stem adjacent said plug end for movement therewith and with its outer edge bearing against the housing to form a barrier resisting flow of fluid about a major portion of said valve element stem beyond its plug end, said barrier having relatively small apertures permitting flow of fluid therethrough while obstructing flow of solid particles to the area of the slidably supported stem, said valve construction further characterized by the screen having a plurality of projections adjacent said apertures extending outwardly from at least one surface of said screen.

9. A fluid shut-off valve comprising:

a valve body having an inlet and an outlet, and
a port communicating said inlet with said outlet,
a seat defining said port,
a valve head engageable with said seat to control fluid flow through said port,
a flexible annular diaphragm connected to and extending from said valve head and having its periphery sealed to said valve body and having bleed apertures formed therethrough for communicating fluid from one to the other side of said diaphragm,
projections extending from said diaphragm adjacent said apertures to prevent blockage of said apertures by foreign particles carried by the fluid passing through said valve body, and
means for moving said valve head relative to said seat.

References Cited by the Examiner
UNITED STATES PATENTS
2,291,101   7/1942   Papulski _____ 251—30

M. CARY NELSON, *Primary Examiner.*